United States Patent
Hayakawa

(10) Patent No.: US 12,103,567 B2
(45) Date of Patent: Oct. 1, 2024

(54) DRIVING CONTROL METHOD OF VEHICLE AND DRIVING CONTROL DEVICE

(71) Applicant: Nissan Motor Co., Ltd., Yokohama (JP)

(72) Inventor: Yasuhisa Hayakawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/285,785

(22) PCT Filed: Apr. 9, 2021

(86) PCT No.: PCT/JP2021/015050
§ 371 (c)(1),
(2) Date: Oct. 5, 2023

(87) PCT Pub. No.: WO2022/215259
PCT Pub. Date: Oct. 13, 2022

(65) Prior Publication Data
US 2024/0190480 A1      Jun. 13, 2024

(51) Int. Cl.
*B60W 60/00*      (2020.01)
*B60W 30/182*      (2020.01)
*B60W 50/08*      (2020.01)

(52) U.S. Cl.
CPC ...... *B60W 60/0053* (2020.02); *B60W 30/182* (2013.01); *B60W 50/082* (2013.01);
(Continued)

(58) Field of Classification Search
None
See application file for complete search history.

(56) References Cited

U.S. PATENT DOCUMENTS

| | | | |
|---|---|---|---|
| 2005/0043867 A1 | 2/2005 | Kudo | |
| 2007/0164852 A1* | 7/2007 | Litkouhi | B60W 30/12 348/118 |

(Continued)

FOREIGN PATENT DOCUMENTS

| | | |
|---|---|---|
| CN | 105264450 A | 1/2016 |
| CN | 111923923 A | 11/2020 |

(Continued)

OTHER PUBLICATIONS

PE2E English Translation with Annotated Paragraphs of DE 102020129955 A1 (Year: 2022).*

*Primary Examiner* — James J Lee
*Assistant Examiner* — Andrew Sang Kim
(74) *Attorney, Agent, or Firm* — Young Basile Hanlon & MacFarlane, P.C.

(57) ABSTRACT

A processor operates to: refer to a switching condition in which a vehicle speed and input form information of an input command are preliminarily associated with each other, to determine whether or not the input form of the input command satisfies the switching condition associated with the vehicle speed; when a determination is made that the input form of the input command satisfies the switching condition corresponding to the vehicle speed, switch a control mode of the vehicle from autonomous driving control to manual driving control based on the input command; and execute driving of the vehicle by the manual driving control.

10 Claims, 8 Drawing Sheets

| Speed/speed range VR | | Switching condition (C) | | | |
|---|---|---|---|---|---|
| | | Input form information | | | |
| | | Order | Type of input system | threshold AT for number of operations of input systems | Torque threshold TT |
| High speed ↑ | First speed range VR1 (VX1≧V2) | 1 | Main switch (151) | AT1=4 (>AT2) | - |
| | | 2 | Cancel button (154) | | - |
| | | 3 | Touch switch (15C) | | - |
| | | 4 | Brake pedal operation | | TT1 (<TT2) |
| | Second speed range VR2(V2>VX2≧V1) | 1 | Main switch (151) | AT2=3 (>AT3) | - |
| | | 2 | Cancel button (154) | | - |
| | | 3 | Brake pedal operation | | TT2 (<TT3) |
| | Third speed range VR3(V1>VX3≧V0) | 1 | Cancel button (154) | AT3=2 (>AT4) | - |
| ↓ Low speed | | 2 | Brake pedal operation | | TT3 (<TT4) |
| | Fourth speed range VR4 (V0>VX4) | 1 | Brake pedal operation | AT4=1 | TT4 |

(52) U.S. Cl.
 CPC ... *B60W 60/0059* (2020.02); *B60W 2510/202* (2013.01); *B60W 2520/10* (2013.01); *B60W 2552/30* (2020.02); *B60W 2556/40* (2020.02)

(56) References Cited

U.S. PATENT DOCUMENTS

| | | | |
|---|---|---|---|
| 2013/0060413 A1* | 3/2013 | Lee | B62D 6/00 |
| | | | 701/23 |
| 2014/0303827 A1 | 10/2014 | Dolgov et al. | |
| 2016/0280236 A1 | 9/2016 | Otsuka | |
| 2018/0173228 A1 | 6/2018 | Wada et al. | |
| 2018/0238696 A1 | 8/2018 | Takeda | |
| 2018/0370542 A1* | 12/2018 | Braunagel | B60W 50/10 |
| 2019/0161092 A1 | 5/2019 | Kim | |
| 2019/0300013 A1 | 10/2019 | Shiraishi et al. | |
| 2020/0307642 A1 | 10/2020 | Tsuji et al. | |
| 2020/0361494 A1 | 11/2020 | Zheng et al. | |
| 2021/0024101 A1 | 1/2021 | Yoshida et al. | |
| 2023/0202531 A1 | 6/2023 | Zheng et al. | |

FOREIGN PATENT DOCUMENTS

| | | |
|---|---|---|
| DE | 102020129955 A1 * | 6/2022 |
| JP | 2005-067322 A | 3/2005 |
| JP | 2016-175613 A | 10/2016 |
| JP | 2018-099919 A | 6/2018 |
| JP | 2019-166949 A | 10/2019 |
| JP | 2019-172112 A | 10/2019 |
| JP | 2019-214241 A | 12/2019 |
| JP | 2020-032949 A | 3/2020 |
| JP | 2020-164075 A | 10/2020 |
| JP | 2021-022042 A | 2/2021 |
| WO | 2017/014012 A1 | 1/2017 |

\* cited by examiner

| | First input device (15) | | | | |
|---|---|---|---|---|---|
| N-th input device (15) | | Cancel button | Confirmation SW | Steering | Brake | Display SW |
| | Cancel button | | C21 | C31 | C41 | C51 |
| | Confirmation SW | C12 | | C32 | C42 | C52 |
| | Steering | C13 | C23 | | C43 | C53 |
| | Brake | C14 | C24 | C34 | | C54 |
| | Display SW | C15 | C25 | C35 | C45 | |

FIG.3

| Switching condition (C) | | | Input form information | | |
|---|---|---|---|---|---|
| Speed/speed range VR | | Order | Type of input system | threshold AT for number of operations of input systems | Torque threshold TT |
| First speed range VR1 (VX1≧V2) | | 1 | Main switch (151) | AT1=4 (>AT2) | - |
| | | 2 | Cancel button (154) | | - |
| | | 3 | Touch switch (15C) | | TT1 (<TT2) |
| | | 4 | Brake pedal operation | | - |
| Second speed range VR2 (V2>VX2≧V1) | | 1 | Main switch (151) | AT2=3 (>AT3) | - |
| | | 2 | Cancel button (154) | | TT2 (<TT3) |
| | | 3 | Brake pedal operation | | - |
| Third speed range VR3 (V1>VX3≧V0) | | 1 | Cancel button (154) | AT3=2 (>AT4) | TT3 (<TT4) |
| | | 2 | Brake pedal operation | | - |
| Fourth speed range VR4 (V0>VX4) | | 1 | Brake pedal operation | AT4=1 | TT4 |

High speed ← → Low speed

FIG.4

DRIVING CONTROL METHOD OF VEHICLE AND DRIVING CONTROL DEVICE

TECHNICAL FIELD

The present invention relates to a driving control method and a driving control device for a vehicle capable of executing autonomous driving control and manual driving control.

BACKGROUND

Known in the art is a technique to determine, based on a steering transition pattern obtained via a steering wheel touch sensor at low speed, whether the steering intervention operation performed during autonomous driving results from an override command based on the driver's intention or an erroneous operation (JP2019-214241A).

SUMMARY

In the above conventional technique, however, even though it is possible to determine whether or not the operation at low speed is an erroneous operation, it is not possible to determine the driver's intention for operations other than those at low speed.

A problem to be solved by the present invention is to provide a driving control method and a driving control device that appropriately determine, in accordance with the vehicle speed, the intention of a driver's input operation that requests switching from autonomous driving control to manual driving control.

The present invention solves the above problem through determining an input form of an input command, referring to a switching condition in which the vehicle speed and input form information of the input command are preliminarily associated with each other, and when the input form of the input command satisfies the switching condition associated with the vehicle speed, switching the control mode of the vehicle from the autonomous driving control to the manual driving control to execute driving of the vehicle.

According to the present invention, the intention of the driver who inputs the input command is determined in accordance with the vehicle speed based on the switching condition corresponding to the vehicle speed, and it is therefore possible to improve the accuracy when taking over the initiative of driving control to the driver.

BRIEF DESCRIPTION OF THE DRAWINGS

FIG. 3 is a diagram illustrating an example of a combination of input devices;

FIG. 4 is a diagram illustrating an example of a switching condition C;

DETAILED DESCRIPTION

Figure 1:
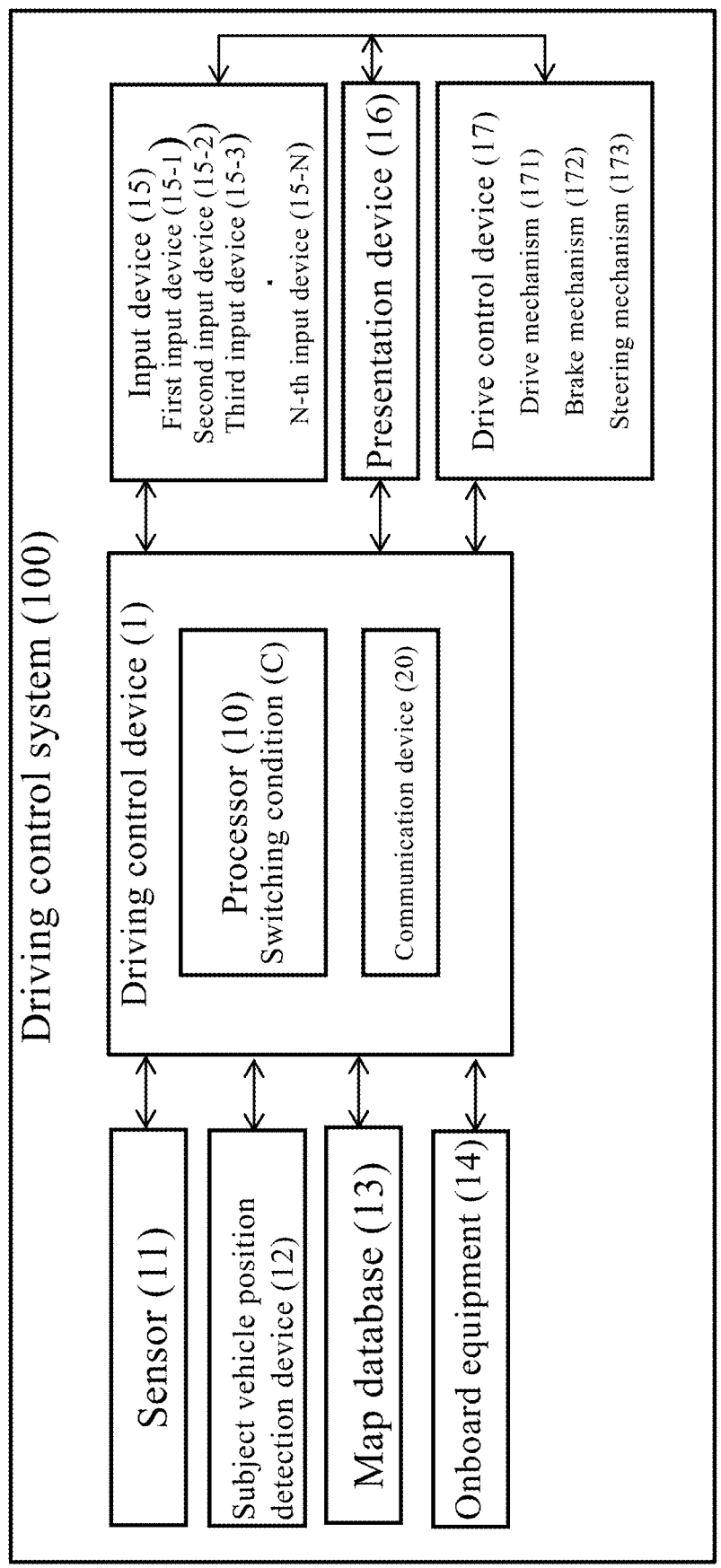
FIG. 1 is a block diagram illustrating an embodiment of a driving control device.

FIG. 1 is a block diagram illustrating the configuration of a driving control system 100 including a driving control device 1 for a vehicle according to an embodiment of the present invention. As illustrated in FIG. 1, the driving control system 100 for a vehicle according to the present embodiment includes a sensor 11, a subject vehicle position detection device 12, a map database 13, onboard equipment 14, an input device 15, a presentation device 16, and a drive control device 17. The driving control device 1 includes a processor 10 and a communication device 20. These devices are connected to one another, for example, via a controller area network (CAN) or other onboard LAN for mutually exchanging information. The driving control device 1 for a vehicle according to the present embodiment represents an embodiment for carrying out the driving control method for a vehicle according to the present invention.

The sensor 11 detects a traveling state of a subject vehicle used for the driving control of a vehicle. Examples of the sensor 11 include one or more cameras that image the front/side/rear of the subject vehicle, one or more radars/laser scanners/ultrasonic sonars that detect obstacles present at the front/side/rear of the subject vehicle, a vehicle speed sensor that detects the vehicle speed of the subject vehicle, a sensor that detects the direction of rotation of the steering wheel, a sensor that detects the steering torque (input torque) applied to the steering wheel, a sensor that detects the depression torque (input torque) applied to the accelerator or brake of the subject vehicle, a touch sensor (capacitance sensor) that detects whether or not the driver holds the steering wheel, a touch sensor that detects when the driver touches a touch switch arranged on a touch panel type display screen, and an onboard camera that images the driver and his/her actions. The sensor 11 may be one of the above-described sensors or may also be a combination of two or more sensors. The detection results of the sensor 11 are output to the processor 10 at predetermined intervals.

The subject vehicle position detection device 12 is composed of a GPS unit, a gyro-sensor, a vehicle speed sensor, etc. The subject vehicle position detection device 12 detects radio waves transmitted from a plurality of communication satellites using the GPS unit to periodically acquire the positional information of the subject vehicle which is a target of the driving control and detects the current position of the subject vehicle based on the acquired positional information of the subject vehicle, angle variation information acquired from the gyro-sensor, and the vehicle speed acquired from the vehicle speed sensor. The positional information of the subject vehicle detected by the subject vehicle position detection device 12 is output to the processor 10 at predetermined intervals.

The map database 13 stores map information such as high-precision map information including positional information of various facilities and specific points in a readable manner. The high-precision map information includes lane identification information and is information in which "static information" and "dynamic information" are associated with the lane identification information. The "static information" includes a road shape (e.g., curvature or radius of curvature) of each lane, an attribute of a lane or a road (a lane width, whether or not it is a vehicle-only road, a speed limit), a merging point/branching point of a lane, a position at which the number of lanes is reduced, a position/content of a traffic sign, a position of a road structure such as a road shoulder, a position of a facility such as a tollgate, etc. The "dynamic information" includes congestion information of each lane, current or future weather in a region including lanes, etc.

The onboard equipment 14 includes various modules equipped in the vehicle and is operated by the driver's operation. Examples of such onboard equipment 14 include a steering wheel, an accelerator pedal, a brake pedal, a navigation device, direction indicators, wipers, lights, and a horn. When the driver operates the onboard equipment 14, its operation information is output to the processor 10.

The input device 15 includes a plurality of input devices 15 (first input device 15-1, second input device 15-2, . . . , N-th input device 15-N: N≠1). The input device 15 receives the driver's input operation on the onboard equipment 14. The input device 15 is, for example, a button switch that allows for input by the driver's operation, a touch switch that is arranged on a touch panel type display screen, a switch that allows for input by the steering operation, a switch that allows for input by the brake depression operation, or a device such as a microphone that allows for input by the driver's voice. Additionally or alternatively, the accelerator pedal of a drive mechanism 171 that controls drive of the vehicle, the brake pedal of a brake mechanism 172, or the steering wheel of a steering mechanism 173 that controls the traveling direction of the vehicle, serves as the input device 15. Input torque input through the steering operation on the steering wheel and input torque input through the depression operation on the brake pedal or accelerator pedal are output to the processor 10.

Figure 2:
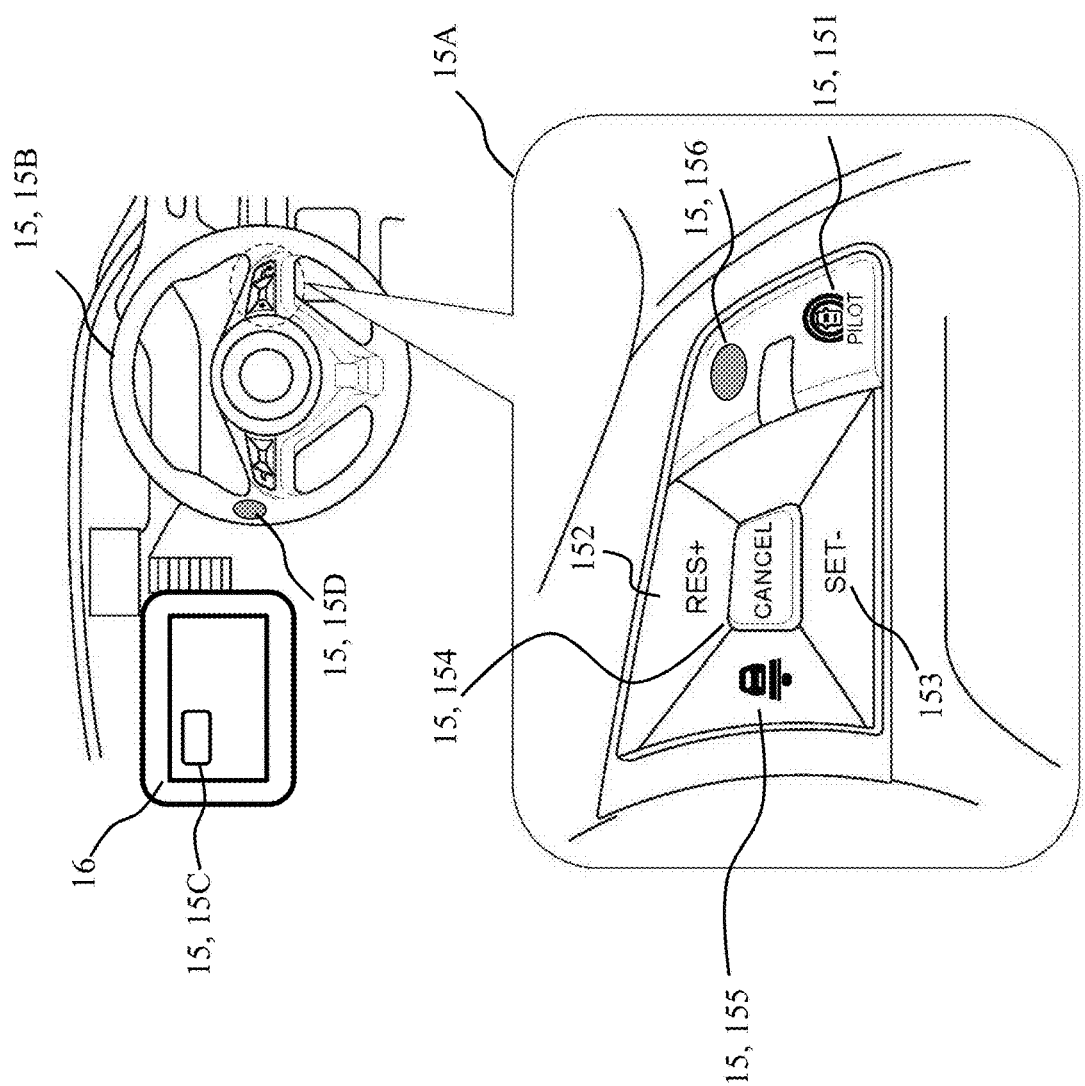
FIG. 2 is a diagram illustrating an example of an input device.

FIG. 2 is a diagram illustrating an example of the input device 15 of the present embodiment. The input device 15 includes a set of button switches 15A arranged on a spoke part or the like of the steering wheel, a steering switch 15B that allows for input of the input command by rotation of the steering wheel, a touch switch 15C provided on the display surface of a display as the presentation device 16, and a set of switches 15D provided at different positions than the set of button switches 15A. The set of switches 15D can be provided on the spoke part of the steering wheel, the center console, or the instrument panel. A microphone that accepts voice input may also be used as a switch. In the illustrated example, the set of button switches 15A of the input device 15 may be button type switches used when setting ON/OFF of an autonomous speed control function and an autonomous steering control function that represent the control modes of autonomous driving provided in the processor 10. The button switches 15A include a main switch 151, a resume/accelerate switch 152, a set/coast switch 153, a cancel button 154 for canceling the autonomous driving control, an inter-vehicle distance adjustment switch 155, and a lane change assist switch 156. In addition to the set of button switches illustrated in FIG. 2, the brake pedal, direction indicators, lights, and other switches of the onboard equipment 14 can be used as the input device 15. A predetermined switch of the input device 15 may be configured to serve as a confirmation switch operated to confirm the driver's intention. The input device 15 transmits, to the processor 10, information on the type of an input system that receives the input command (identification information of the input device 15-N) and information indicating an input form including the input torque to the input device 15-N.

Each switch can be used for the input operation in combination with one or more other switches. FIG. 3 is a diagram illustrating an example of a combination of the first input device 15-1 and the N-th input device 15-N. Each input device 15 and its combination can be arbitrarily defined. When a combination C12 of the cancel button 154 and a confirmation switch of the set of switches 15D is detected, the types of input systems are the "cancel button 154" and the "confirmation switch," and the number of operations is two. In this example, when an input is made via a common input device 15, the number of operations of input systems is not counted up. When C12 and C13 are detected, therefore, the number of operations of input systems is three. On the other hand, it is also possible to assign different identification information to the first input and second input to the same input device 15 and count up the number of multiple input operations as the number of operations.

The presentation device 16 is a device that conveys information to the occupants. For example, the presentation device 16 is represented by information representation devices such as a display of a navigation device, a display incorporated in a rearview mirror, a display incorporated in a meter unit, a head-up display projected on a windshield, a speaker of an audio device, and a seat device with embedded vibrating bodies. Under the control by the processor 10, the presentation device 16 notifies the driver of acceptance/refusal of the switching command and switching of the control mode.

The drive control device 17 controls the driving of the subject vehicle according to instructions from the processor 10, which will be described later. The drive control device 17 has an autonomous speed control function that allows the subject vehicle to travel at a constant set speed and an autonomous follow-up travel control function that allows the subject vehicle to travel to follow a preceding vehicle. To realize these functions, the drive control device 17 controls the operation of the drive mechanism 171 and the operation of the brake mechanism for achieving the acceleration/deceleration and traveling speed of the subject vehicle. The drive control device 17 further has a lane-keeping driving function for detecting lane markers of a lane in which the subject vehicle travels and controlling the traveling position of the subject vehicle in the road width direction so that the subject vehicle travels in the lane and a travel assistance function that allows the subject vehicle to autonomously execute the overtaking of a preceding vehicle, the lane-changing travel, and the right or left turn at an intersection. To realize these functions, the drive control device 17 executes the steering control of the subject vehicle by controlling the operation of the steering actuator of the steering mechanism 173 in addition to the operations of the drive mechanism 171 and brake mechanism for achieving the acceleration/deceleration and the traveling speed. The contents of the driving control method (method of autonomous driving control and manual driving control) executed by the drive control device 17 are not particularly limited, and the techniques at the time of filing the present application can be applied.

The processor 10 of the driving control device 1 controls the driving of the vehicle through an autonomous driving control mode A executed by the autonomous driving system and a manual driving control mode B executed by the driver's operation input and performs switching control between these control modes. The switching control for the control mode from the autonomous driving control to the manual driving control is also referred to as so-called takeover processing. The processor 10 is composed of a read only memory (ROM) that stores programs for controlling the travel of the subject vehicle, a central processing unit (CPU) that executes the programs stored in the ROM, and a random access memory (RAM) that serves as an accessible storage device. The processor 10 transmits and receives information via the communication device 20.

The processor 10 executes the programs stored in the ROM using the CPU thereby to achieve the following functions: an autonomous driving control function for autonomously controlling the travel of the subject vehicle; an input form determination function for determining the input form of an input command input by the driver's input operation; a condition determination function for determining whether or not the input form of an input command satisfies a switching condition associated with the vehicle speed; and a switching function for switching the control mode of the vehicle from the autonomous driving control to the manual driving control. The processor 10 may further have a correction function for correcting the switching condition and/or an input determination function for determining whether or not an input operation is input. These functions will be described below.

The input form determination function will first be described. The processor 10 determines the input form of an input command input by the driver's input operation. The input form includes one or more of the type of an input system with which the input command is input, the number of operations of input systems, and the input torque of an input operation for the input command, or a combination of two or more.

The processor 10 extracts the identification information of input devices 15 indicating input systems from the information on a plurality of input commands and determines the types of input systems. The processor 10 determines the number of operations of input systems through comparing the extracted identification information of input devices 15 and counting, based on the number of non-identical identification information items, the number of input devices 15 with which the driver performs the input operations.

The processor 10 acquires, based on the detection information obtained from the sensors of each mechanism that controls the drive of the vehicle, the input torque (amount) of an input operation when an input command is input by the user. The input torque is the amount of steering of the steering wheel or the amount of depression of the brake pedal. The driver's steering torque applied to the steering wheel is detected by a torque sensor of the steering mechanism 173. The brake depression torque applied to the brake pedal is detected by a torque sensor of the brake mechanism 172.

The condition determination function will be described. The processor 10 determines whether or not the input form of an input command satisfies a switching condition associated with the vehicle speed. FIG. 4 illustrates an example of a switching condition C. The switching condition C is stored in a storage device such as a ROM. This switching condition C is a condition in which the vehicle speed (its concept includes the vehicle speed range) and the input form information of an input command are preliminarily associated with each other. The input form information of this example includes the types of input systems, an evaluation threshold for the number of operations of input systems, the order of input operations with the input systems, and an input torque threshold.

The switching condition C illustrated in FIG. 4 defines four vehicle speed ranges of a first vehicle speed range VR1 to a fourth vehicle speed range VR4 of the vehicle speed. For each of the vehicle speed ranges, the switching condition C defines one or more "types of input systems" for an input command required to execute a control mode switching command. For example, the first vehicle speed range VR1 defined as the highest vehicle speed range (VX1≥V2) is associated with four types of input systems: (1) the main switch 151; (2) the cancel button 154; (3) the touch switch 15C; and (4) the brake pedal operation. The switching condition C may define the order of operations of the switches to be operated. Input operations may be required according to the order of the above numbers (1) to (4). When the vehicle is traveling at a speed within the first vehicle speed range VR1, the switching condition C requires input operations via the input systems (1) to (4) for execution of the control mode switching process. In this switching condition C, the number of types of input systems associated with the relatively high first vehicle speed range VR1 (e.g., V2 or higher) is larger than the number of types of input systems associated with the second vehicle speed range VR2 (e.g., less than V2) lower than the first vehicle speed range VR1. At relatively high vehicle speeds, a high input load is imposed to ascertain the driver's intention. The driver's intention is accurately determined by requesting the driver to input via more types of input systems.

Figure 5:
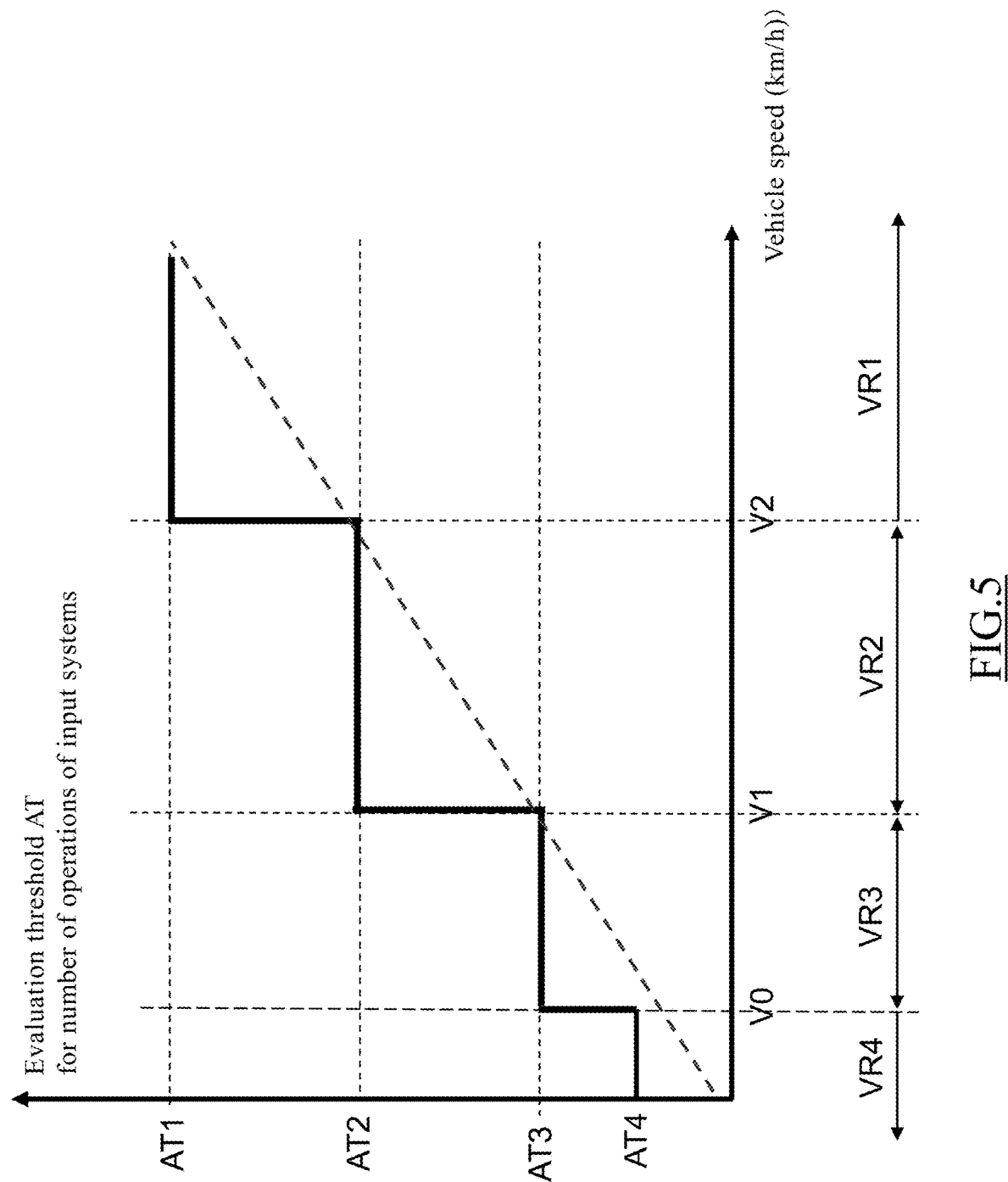
FIG. 5 is a diagram illustrating an example of a switching condition in which a vehicle speed and an evaluation threshold related to the number of operations of input systems are associated with each other.

Additionally or alternatively, for each of the vehicle speed ranges, the switching condition C illustrated in FIG. 4 defines an "evaluation threshold AT for the number of operations of input systems" for an input command required to execute the control mode switching command. In this switching condition C, a first evaluation threshold AT1 for the number of operations of input systems associated with the relatively high first vehicle speed range VR1 (e.g., V2 or higher) is a higher (larger) value than a second evaluation threshold AT2 for the number of operations of input systems associated with a second vehicle speed range VR2 (e.g., less than V2) lower than the first vehicle speed range VR1. FIG. 5 illustrates the relationship between a vehicle speed V and an evaluation threshold AT for the number of operations of input systems. The evaluation threshold AT associated with high vehicle speeds is a higher value than an evaluation threshold AT' associated with relatively low vehicle speeds, and the higher the vehicle speed, the larger the number of operations of input systems required to execute the control mode switching command. At relatively high vehicle speeds, a high input load is imposed to ascertain the driver's intention. The driver's intention is accurately determined by requesting the driver to perform more operations. As indicated by the solid line in FIG. 5, the evaluation threshold may be set so as to increase stepwise as the vehicle speed range increases. Alternatively, as indicated by the dashed line in FIG. 5, the evaluation threshold may be set so as to simply increase as the vehicle speed range increases. The evaluation threshold is experimentally set based on the vehicle performance and the like. Although not particularly limited, the lower limit vehicle speed V1, which is the threshold for the second vehicle speed range VR2, may be 20 to 50 km/h and preferably 30 to 40 km/h. V0 in the fourth vehicle speed range VR4, which is an extremely low speed range in which the vehicle can be stopped even by a sudden brake operation, may be set to 5 to 10 km/h. In the fourth vehicle speed range VR4 of this example, the type of input system is only the brake pedal, and the evaluation threshold for the number of operations is "1."

As illustrated in FIG. 4, the switching condition C defines, as input form information, a torque threshold for the input torque corresponding to the vehicle speed. The torque threshold is defined as a criterion for determining whether or not the input of an input command is executed when the input operation for controlling the driving/braking/steering of the vehicle is performed. The switching condition C defines torque thresholds for respective vehicle speed ranges for each input operation of controlling the driving/braking/steering of the vehicle. The torque thresholds are defined based on the amount of depression of the brake pedal, the amount of depression of the accelerator pedal, and the steering amount of the steering wheel.

Figure 6:
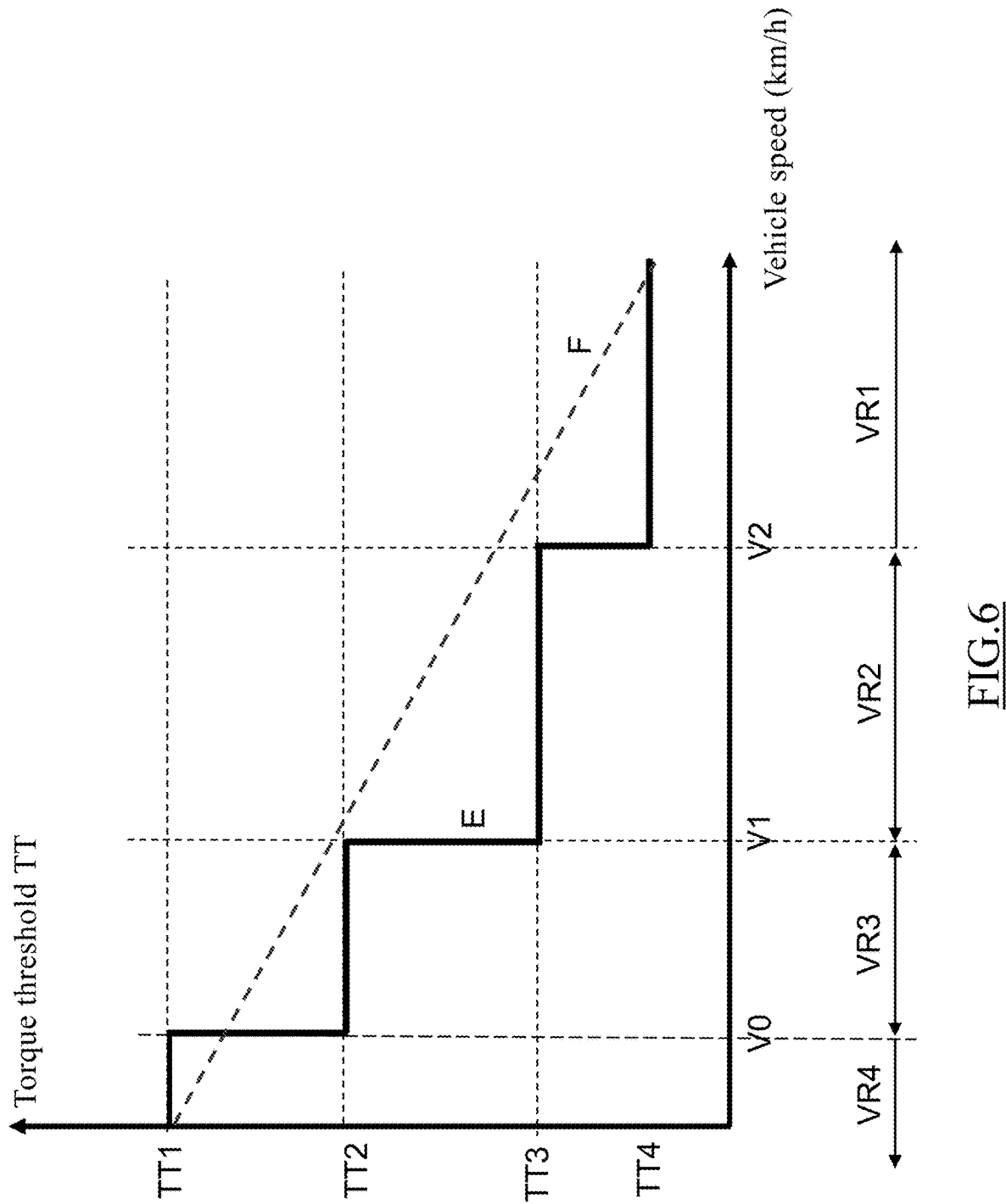
FIG. 6 is a diagram illustrating an example of a switching condition in which a vehicle speed and a torque threshold are associated with each other.

In this switching condition C, a first torque threshold TT1 for the amount of depression of the brake pedal associated with the relatively high first vehicle speed range VR1 (e.g., V2 or higher) is a lower value than a torque threshold TT2 associated with the second vehicle speed range (e.g., less than V2) lower than the first vehicle speed range VR1. FIG. 6 illustrates the relationship between a vehicle speed V and a torque threshold TT for the input torque. As illustrated in the figure, the input torque threshold TT associated with high vehicle speeds is a lower value than an input torque threshold TT' associated with relatively low vehicle speeds, and the higher the vehicle speed, the lower the torque amount in the input operation required to execute the control mode switching command. As indicated by the solid line in FIG. 6, the torque threshold may be set so as to decrease stepwise as the vehicle speed range increases. Alternatively, as indicated by the dashed line in FIG. 6, the torque threshold may be set so as to simply decrease as the vehicle speed range increases. The torque threshold is experimentally set based on the vehicle performance and the like.

Here, the input determination function will be described. The processor 10 determines whether or not an input operation is input. The processor 10 refers to the torque threshold TT defined in the switching condition C in association with the vehicle speed. When the input torque is equal to or larger than the torque threshold TT corresponding to the vehicle speed, the processor 10 determines that an input command is "input." When a determination is made that an input command is input, the above-described input form determination function is used to acquire the type of the input command or the number of operations. The processor 10 determines, based on the input form, whether or not the switching condition C corresponding to the vehicle speed is satisfied. The presence or absence of the input of an input command can be accurately determined through setting a torque threshold corresponding to the vehicle speed for each input operation and determining that the input operation is performed when the torque threshold is exceeded, and the driver's intention can be determined with a high degree of accuracy.

When the vehicle speed is high, the amount of vehicle behavior corresponding to the amount of input torque increases, so this switching condition C does not require a large input torque for the switching control when the vehicle speed is high. It is therefore possible to accurately determine whether or not an input command is input while ensuring the traveling stability, and the driver's intention can be determined with a high degree of accuracy. On the other hand, the lower the vehicle speed, the larger the input torque for moving the vehicle by a predetermined amount. Accordingly, even when the torque threshold is set high in the extremely low speed range such as the fourth vehicle speed range VR4 in FIG. 4, the driver's operational load is not weighted by the switching condition C. In the extremely low speed range, even when a large amount of input torque is input, the amount of vehicle behavior does not change significantly; therefore, by requesting a relatively large input torque, the driver's intention can be accurately confirmed, and it is possible to reliably take over the initiative of driving control to the driver.

The condition determination function will then be described. The processor 10 determines whether or not the input form of an input command satisfies the switching condition associated with the vehicle speed. The processor 10 refers to the switching condition C and extracts the thresholds for the input form information to which the vehicle speed VX detected at the input timing of the input command belongs (predetermined type of input system/evaluation threshold for the number of operations/torque threshold). The switching condition C corresponding to the vehicle speed is represented by a value for evaluating whether or not the input command which is input at that vehicle speed is based on the driver's intention. When the input form information acquired by the input command satisfies the switching condition C corresponding to the vehicle speed when the input command is input, the processor 10 determines that the switching command for the control mode is a command that accurately reflects the driver's intention.

The processor 10 reads the switching condition C associated with the vehicle speed range to which the acquired vehicle speed belongs, compares the input form of the input command with the input form information in the switching condition C, and determines whether or not the switching condition C associated with the vehicle speed range to which the vehicle speed belongs is satisfied. The processor 10 determines the types of input systems determined from the input forms of input commands and determines that the switching condition C is satisfied when the types of input systems include all of predetermined types of input systems corresponding to the vehicle speed in the switching condition C, that is, when all the input commands via the input systems defined in the switching condition C corresponding to the vehicle speed are complete (the input can be confirmed). For example, in the switching condition C of FIG. 4, when the vehicle speed VX acquired from the vehicle speed sensor is VX2, the processor 10 refers to the switching condition C associated with the vehicle speed range VR2, compares the input forms of input commands with the switching condition C, and determines that the switching condition C upon the vehicle speed VX=VX2 is satisfied when it is confirmed that the input commands are input via the input systems: (1) the main switch 151; (2) the cancel button 154; and (3) the brake operation. In this operation, the order of operating the input systems may be taken into account.

Additionally or alternatively, the processor 10 counts the number of operations of input systems determined from the input forms of input commands and determines that the switching condition C is satisfied when the input commands are input via a number of input systems that is equal to or larger than the evaluation threshold At for the input systems corresponding to the vehicle speed in the switching condition C. For example, when the vehicle speed VX acquired from the vehicle speed sensor is VX2, the processor 10 refers to the evaluation threshold AT2 associated with the vehicle speed range VR2 in the switching condition C. The processor 10 determines that the switching condition C is satisfied when it is confirmed that the number of operations of input systems with which the input commands are input is 3 or more. The number of operations of input systems to count can be, for example, the number of input commands that are input within a predetermined time DT from the timing G1 at which an input command is detected first via a preliminarily defined input system such as the cancel button 154 related to the switching command.

The correction function for the switching condition C will then be described. The processor 10 corrects the above-described switching condition C according to a difficulty level of lane-keeping travel. The processor 10 acquires information on the current position of the subject vehicle from the subject vehicle position detection device 12, refers to the map database 13, specifies, based on the current position of the vehicle, the lane in which the vehicle is traveling or is scheduled to travel, and calculates the difficulty level of lane-keeping travel in that lane. The difficulty level of lane-keeping travel is determined based on the curve curvature and/or lane width of the lane in which the vehicle is traveling or is scheduled to travel. The processor 10 refers to the map database 13 and calculates the curve curvature and/or lane width of the lane in which the vehicle is traveling or is scheduled to travel. The difficulty level of lane-keeping travel may be determined using techniques known at the time of filing based on the lane detection accuracy, lane recognition accuracy, weather (rain/snow), etc. When the lane detection accuracy or the like is lower/worse than a standard value that is preliminarily set, the difficulty level of lane-keeping travel increases (is more difficult). Provided that the difficulty level of lane-keeping travel is 100 when traveling in a reference lane (predetermined curvature/lane width), the difficulty level of lane-keeping travel when traveling in a target lane may be expressed as a ratio to 100.

The processor 10 corrects the switching condition C associated with the vehicle speed according to the difficulty level of lane-keeping travel. The processor 10 corrects the switching condition C when the difficulty level of lane-keeping travel is relatively high so that it is relaxed to the switching condition C when the difficulty level of lane-keeping travel is relatively low. Relaxation of the switching condition C refers to a change that alleviates/reduces the input load of an input command required according to the vehicle speed when the control mode switching control is executed. Specifically, the processor 10 can relax the switching condition C by making a correction to delete a part of the predetermined types of input systems in the switching condition C. The processor 10 can relax the switching condition C by correcting the evaluation threshold for the number of operations of input systems in the switching condition C to a lower value. The processor 10 can relax the switching condition C by correcting the torque threshold for determining the presence or absence of an input operation in the switching condition C to a lower value.

Figure 7:
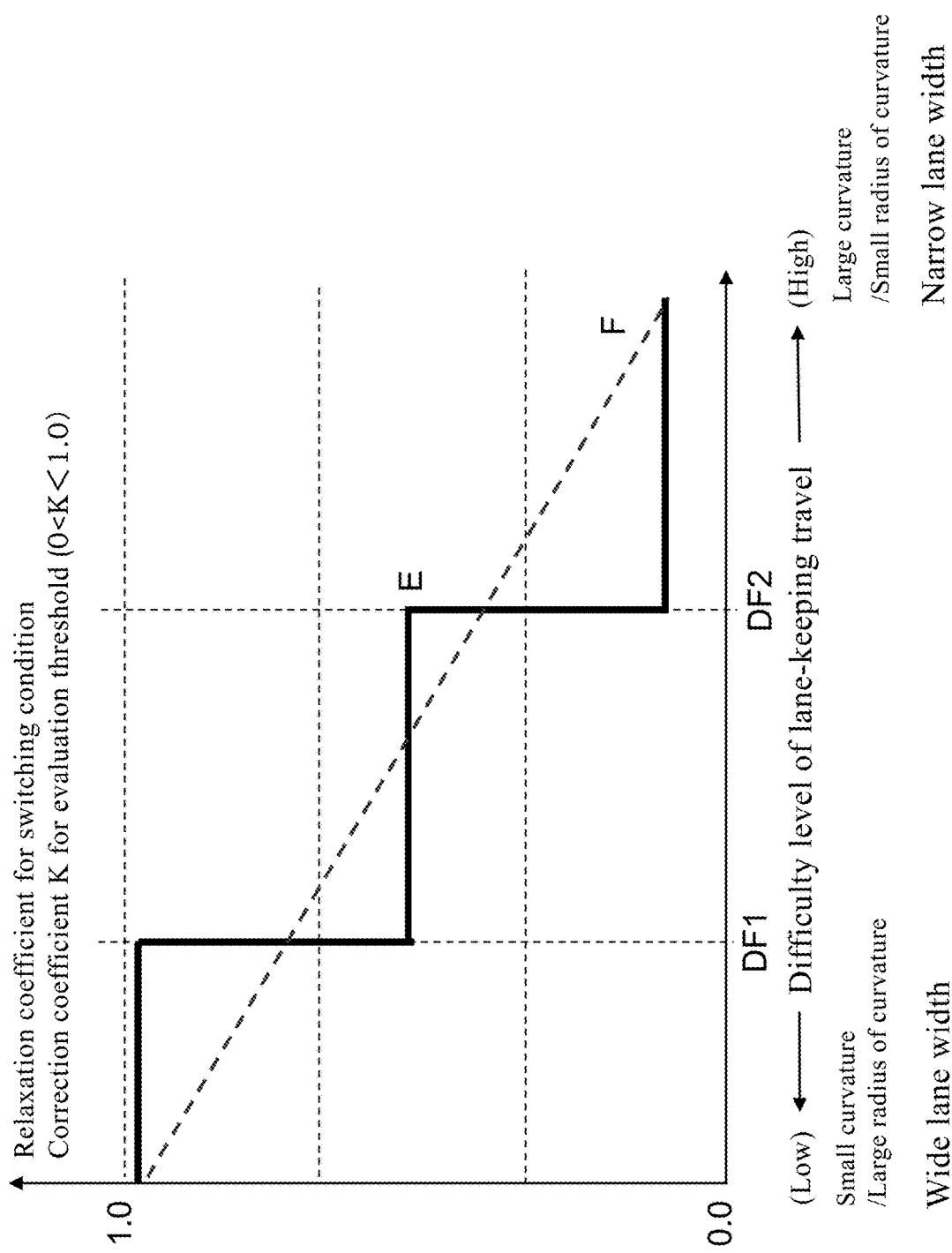
FIG. 7 is a diagram illustrating an example of correction of a switching condition.

FIG. 7 illustrates an example of the relationship between the relaxation of switching condition C and the difficulty level of lane-keeping travel. FIG. 7 illustrates a relaxation coefficient for the switching condition C with respect to the difficulty level of lane-keeping travel. The relaxation coefficient indicates the ratio of the corrected "switching condition C'" to the reference "switching condition C" corresponding to the same vehicle speed (range). Provided that four types of input systems are defined in the reference switching condition C, the relaxation coefficient when deleting the type of one input system is 0.75. Provided that the evaluation threshold for the number of operations is defined as "4" in the reference switching condition C, the relaxation coefficient or correction coefficient when correcting the evaluation threshold to "2" is 0.50. As indicated by the solid line in FIG. 7, the relaxation coefficient or correction coefficient may be changed stepwise according to the difficulty level of lane-keeping travel or may also be changed linearly as indicated by the dashed line in the figure. In a scene in which it is difficult to continue the control of lane-keeping travel, the switching condition C can be alleviated thereby to switch the control mode to the manual driving control with a relatively simple operation without requiring a high operational load on the driver. In a scene in which it is difficult to continue the lane-keeping travel, the driver can easily switch to the manual driving control with a low-load operation.

The switching function of the processor 10 will be described. The switching function for the control mode is executed when the input command including a switching command to switch from the autonomous driving control to the manual driving control is input by the user's operation while the autonomous driving control is being executed using the aforementioned autonomous driving control function (during execution of the autonomous driving control). When determining that the input form of an input command satisfies the switching condition C corresponding to the vehicle speed, the processor 10 switches the control mode of the vehicle from the autonomous driving control to the manual driving control. The amount of change in the vehicle behavior varies depending on the speed, so the takeover of control (control responsibility) due to the change of the control mode from the autonomous driving control to the manual driving control may have to be performed more accurately/reliably as the vehicle speed increases. Accurate takeover of the initiative of driving control of the vehicle means that the driver recognizes that the initiative of driving control will be taken over and the timing thereof and immediately executes the control that has been taken over (i.e., the driver inputs the input command for the manual operation control immediately after the control mode switching process).

In the present embodiment, the change of control mode is executed according to whether or not the input form by the driver's input operation satisfies the switching condition C corresponding to the vehicle speed; therefore, the switching of control mode from the autonomous driving control to the manual driving control can be performed in accordance with the driver's intention, and the initiative of driving control can be reliably taken over to the driver. As a result, the occurrence of a time lag in the transfer of the initiative of driving control can be suppressed, and it is therefore possible to execute the takeover from the autonomous driving control to the manual driving control while maintaining the traveling stability at high speeds without imposing an excessive operational load on the driver at low speeds. When the input command is acquired in an input form that satisfies the switching condition C corresponding to the vehicle speed, a determination can be made with a high degree of accuracy that the input command requesting the switching, which is input while the vehicle is traveling at that speed, is based on the driver's intention. This allows the switching from the autonomous driving control to the manual driving control to be executed based on the driver's intention, and the initiative of driving control can be taken over in accordance with the driver's intention.

The higher the vehicle speed, the larger the amount of change in the vehicle behavior per unit time, so the importance of confirmation of the driver's intention increases as the vehicle speed when changing the control mode to the manual driving control increases. When the vehicle speed is relatively high and the control mode is switched to the manual driving control, the processor 10 of the present embodiment requests a relatively heavy operational load from the driver by increasing the types of input systems (the number of types) or increasing the evaluation threshold for the number of operations of input systems as compared to when the vehicle speed is relatively low. When the vehicle speed is high, operations using more input systems are required to change (take over) the control mode than when the vehicle speed is low, and the driver's intention can therefore be clearly reflected in the operation (movement).

On the other hand, when a determination is made that the input form of an input command does not satisfy the switching condition C corresponding to the vehicle speed, the switching of the control mode from the autonomous driving control to the manual driving control is prohibited. When the input command does not satisfy the switching condition C which preliminarily defines an input operation with a sufficient operational load, a determination is made that the input command is not based on the driver's intention. If the control mode is changed by a switching command that is not intended by the driver, the driver will not expect to take over the driving control initiative and will be confused, and it takes time from the end of the autonomous driving control to the start of the manual driving control by the driver.

Thus, if the autonomous driving control is switched to the manual driving control due to an operation that is not based on the driver's intention (i.e., an erroneous operation), the driver cannot perceive the situation in which he/she has to play a leadership role in driving, and therefore cannot start driving immediately. Accordingly, a time lag occurs between the end of the autonomous driving control and the start of the manual driving control by the driver. The occurrence of a time lag at the time of takeover during high speed traveling is undesirable even if it is short time and the occurrence itself should be suppressed because the amount of movement per unit time of a vehicle traveling at high speed is large. In this context, according to the present embodiment, the control mode is changed to the manual driving control after determining with the switching condition C that the input command is based on the driver's intention, and the initiative of driving control can therefore be immediately taken over to the driver under the confirmed driver's intention.

In the present embodiment, a relatively high operational load is defined in the switching condition C when the vehicle speed is relatively high, and the driver is thereby required to perform a high-load input operation. The input operation is executed with a high load when the vehicle speed is high, and it is thereby possible to confirm the driver's intention with respect to the switching command. The initiative of driving control is taken over based on the driver's recognition, and the driver can thereby start the manual driving control immediately after the end of the autonomous driving control, so the initiative of driving control can be taken over to the driver without causing a time lag between the driver's consciousness and the change of control mode.

Moreover, in the present embodiment, a relatively low operational load is defined in the switching condition C when the vehicle speed is relatively low. During low-speed driving, a scene in which the vehicle repeatedly stops and starts is assumed, such as when traveling in traffic congestion, and there is a possibility that the switching of the control mode will be performed frequently. In this example, the types of input systems and/or the number of operations via the input systems are reduced at low speeds as compared to those at high speeds, and it is therefore possible to alleviate the operational load on the driver at low speeds in which the start/stop is repeated, while weighting the operational load at high speeds to ensure that the driver's intention is confirmed.

The switching function will be described. When the control mode is switched to the manual driving control, the processor 10 transmits a command to that effect to the drive control device 17 to cancel the autonomous driving control and start driving under the manual driving control according to the manual driving operation. The presentation device 16 may be presented with the fact that the control mode has been switched to the manual operation control.

Figure 8:
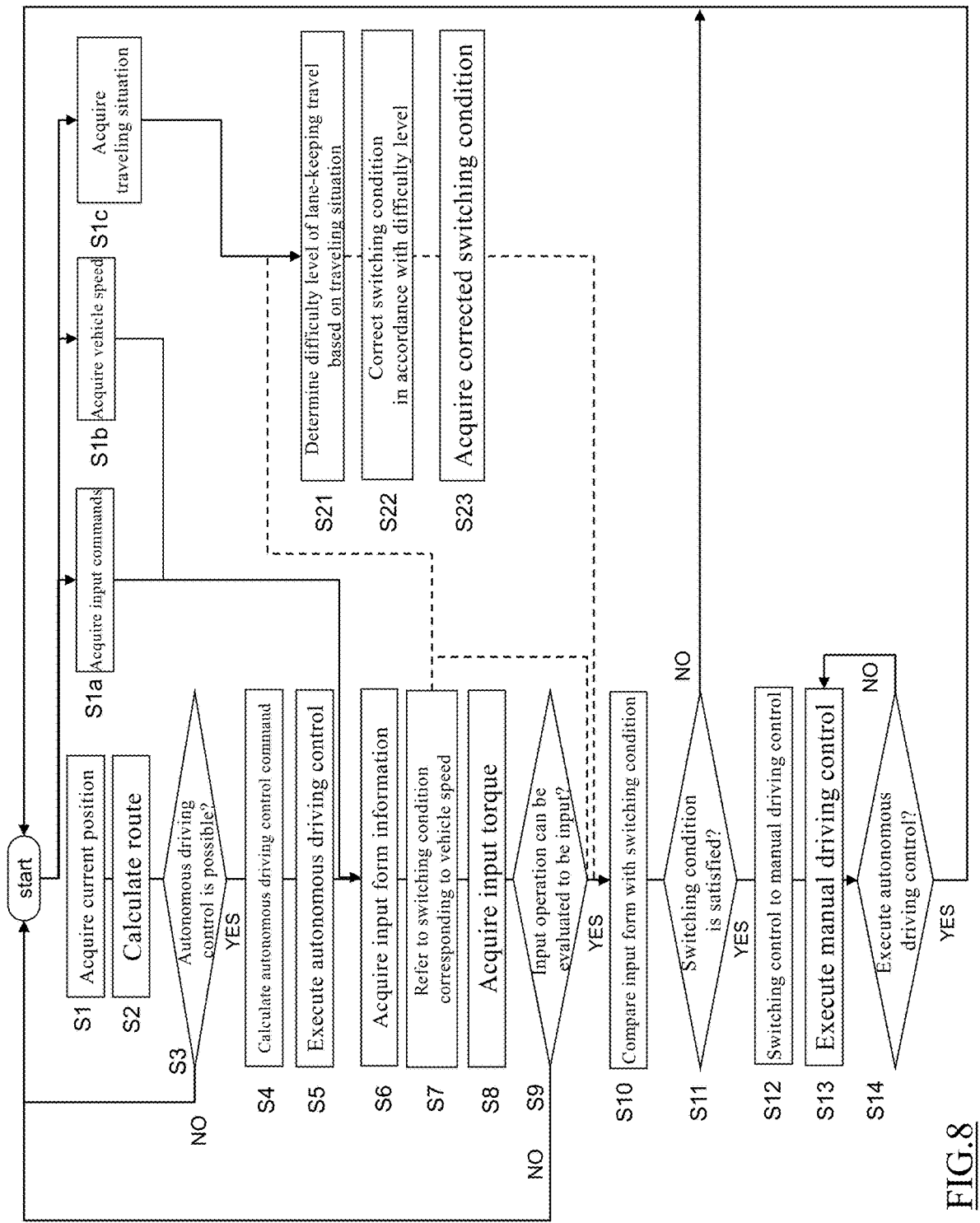
FIG. 8 is a flow chart illustrating an example of control procedure of a driving control process.

FIG. 8 is a flowchart illustrating the procedure of the driving control according to the present embodiment. The processor 10 acquires the current position via the subject vehicle position detection device 12 (S1), acquires input commands from the driver via input devices 15 (S1a), acquires a vehicle speed via the sensor 11 (S1b), and refers to the map database 13 to acquire the information on the traveling situation (S1c). These steps are performed at predetermined intervals. The processor 10 calculates, based on the acquired information, a route along which the subject vehicle travels (S2). The processor 10 determines whether or not the autonomous driving control is possible (S3). When the preliminarily set autonomous driving execution conditions are satisfied, such as when the high-precision map information of the travel route can be referred to, when the lanes can be accurately detected and identified, and when the driver is in a wakeful state, the processor 10 determines that the autonomous driving control is possible. When a determination is made that the autonomous driving control is possible, the autonomous driving control command is calculated (S4) and the drive control device 17 is controlled to execute the autonomous driving control based on the autonomous driving control command (S5). The autonomous driving control is executed using the autonomous driving control function of the processor 10. If the autonomous driving control is not possible, the above-described processes of step S1 and subsequent steps are repeated while continuing the manual driving control.

The processor 10 acquires the input form information from the information on the input commands acquired in S1a (S6). The processor 10 acquires, as the input form information, the types (identification information) of input systems with which the input commands are input. The processor 10 counts the types of input systems with which a series of input commands is input within a predetermined time from the timing at which the input of the first input command is detected, and acquires the number of operations of input systems as the input form information.

The processor 10 reads the switching condition C corresponding to the acquired vehicle speed (S7). The processor 10 may acquire, as the input form information, the input torque of an input operation when an input command is input (S8). The processor 10 refers to the switching condition C corresponding to the vehicle speed, and when the input torque of the input operation is equal to or larger than the torque threshold in the switching condition C, determines that the input command is input (S9: YES). The processor 10 extracts an input command that is input with an input torque equal to or larger than the torque threshold, and adopts it as a target object as to whether the switching condition C is satisfied or not. If NO in S9, the process may return to step S1. The process may skip steps S8 and S9 and proceed from step S7 to step S10 according to the flow indicated by the dashed line.

The processor 10 compares the input form of an acquired input command with the input form information (types of input systems, number of operations) of the switching condition C corresponding to the vehicle speed being referred to (S10). The processor 10 determines, as a result of the comparison, whether or not the input form of the input command satisfies the switching condition C (S11). When a determination is made that the switching condition C is satisfied (YES in S11), the switching control is executed (S12). The processor 10 switches the control mode from the autonomous driving control to the manual driving control and allows the vehicle to execute the driving by the manual driving control (S13). When a determination is made to return from the manual driving control to the autonomous driving control again, the autonomous driving control is executed (S14). The process returns to step S1 and waits for transition to the manual driving control.

In step S7, a process of correcting the switching condition C corresponding to the vehicle speed referred to may be performed. The processor 10 acquires the difficulty level in continuing the lane-keeping travel control, specifically the curve curvature and/or lane width of the travel lane (S21). The processor 10 corrects the content of the switching condition C associated with the vehicle speed in accordance with the difficulty level of the lane-keeping travel in the lane in which the vehicle is traveling or is scheduled to travel (S22). The processor 10 reads the corrected switching condition C as a new reference (S23). Steps S21 to S23 can be skipped.

DESCRIPTION OF REFERENCE NUMERALS

100 . . . Driving control system
1 . . . Driving control device
10 . . . Processor
11 . . . Sensor
12 . . . Subject vehicle position detection device
13 . . . Map database
14 . . . Onboard equipment
15 . . . Input device
16 . . . Presentation device
17 . . . Drive control device
20 . . . Communication device

The invention claimed is:

1. A driving control method for a vehicle used in a driving control device of the vehicle, the driving control method including switching control of a control mode between autonomous driving control of the vehicle and manual driving control of the vehicle by a driver, the driving control device including a processor configured to:
determine, as an input form of an input command input by an input operation of the driver, a number of operations of an input system with which input commands of different types are input;
acquire a vehicle speed of the vehicle;
refer to a switching condition in which the vehicle speed and input form information of the input command are preliminarily associated with each other so that a number of types of input systems associated with a first vehicle speed range is larger than a number of types of input systems associated with a second vehicle speed range lower than the first vehicle speed range, to determine whether or not the determined input form satisfies the switching condition associated with the vehicle speed;
when a determination is made that the input form of the input command satisfies the switching condition, switch the control mode of the vehicle from the autonomous driving control to the manual driving control; and
execute driving of the vehicle by the manual driving control.

2. The driving control method according to claim 1, wherein the input form is a type of the input system with which the input command is input, and the processor operates to:
determine the type of the input system for the input command;
refer to the switching condition in which a predetermined type of the input system corresponding to the vehicle speed is defined as the input form information; and
when the type of the input system includes the predetermined type corresponding to the vehicle speed, determine that the switching condition is satisfied.

3. The driving control method according to claim 1, wherein the processor operates to:
count the number of operations of the input system;
refer to the switching condition in which an evaluation threshold for the number of operations of the input system corresponding to the vehicle speed is defined as the input form information; and
when the number of operations of the input system is equal to or larger than the evaluation threshold corresponding to the vehicle speed, determine that the switching condition is satisfied.

4. The driving control method according to claim 3, wherein the switching condition is defined such that a first evaluation threshold for the number of operations of the input system associated with the vehicle speed equal to or larger than a predetermined vehicle speed threshold is a value higher than a second evaluation threshold for the number of operations of the input system associated with the vehicle speed less than the predetermined vehicle speed threshold.

5. The driving control method according to claim 1, wherein the processor operates to:
refer to a map database;
calculate, based on a current position of the vehicle, a difficulty level of lane-keeping travel in a lane in which the vehicle is traveling or is scheduled to travel; and
when a determination is made that the difficulty level of the lane-keeping travel is equal to or larger than a predetermined threshold, make a correction to relax the switching condition associated with the vehicle speed.

6. The driving control method according to claim 1, wherein the processor operates to:
refer to a map database;
calculate, based on a current position of the vehicle, a curve curvature of a lane in which the vehicle is traveling or is scheduled to travel; and
when a determination is made that the curve curvature of the lane in which the vehicle is traveling or is scheduled to travel is equal to or larger than a curve threshold, make a correction to relax the switching condition associated with the vehicle speed.

7. The driving control method according to claim 1, wherein the processor operates to:
refer to a map database;
calculate, based on a current position of the vehicle, a lane width of a lane in which the vehicle is traveling or is scheduled to travel; and
when a determination is made that the lane width of the lane in which the vehicle is traveling or is scheduled to travel is less than a width threshold, make a correction to relax the switching condition associated with the vehicle speed.

8. The driving control method according to claim 1, wherein the input form includes an input torque of the input operation with which the input command is input, and the processor operates to:
acquire the input torque of the input operation;
refer to the switching condition in which a torque threshold for the input torque corresponding to the vehicle speed is defined as the input form information; and when the input torque is equal to or larger than the torque threshold corresponding to the vehicle speed, determine that the input operation is input.

9. The driving control method according to claim 8, wherein the switching condition is defined such that a first torque threshold for the input torque associated with the vehicle speed equal to or larger than a predetermined vehicle speed threshold is smaller than a second torque threshold for the input torque associated with the vehicle speed less than the predetermined vehicle speed threshold.

10. A driving control device for a vehicle executing switching control of a control mode between autonomous driving control of the vehicle and manual driving control of the vehicle by a driver, the driving control device including a processor that causes the driving control device to execute:
  a process of determining, as an input form of an input command input by an input operation of the driver, number of operations of an input system with which input commands of different types are input;
  a process of acquiring a vehicle speed of the vehicle;
  a process of referring to a switching condition in which the vehicle speed and input form information of the input command are preliminarily associated with each other so that the number of types of input systems associated with a first vehicle speed range is larger than the number of types of input systems associated with a second vehicle speed range lower than the first vehicle speed range, to determine whether or not the determined input form of the input command satisfies the switching condition associated with the vehicle speed;
  a process of switching the control mode of the vehicle from the autonomous driving control to the manual driving control when a determination is made that the input form of the input command satisfies the switching condition corresponding to the vehicle speed; and
  a process of executing driving of the vehicle by the manual driving control.

\* \* \* \* \*